United States Patent [19]

Cameron et al.

[11] 4,366,097

[45] Dec. 28, 1982

[54] NOVEL PROTEIN ISOLATION PROCEDURE

[75] Inventors: Jacquelyn J. Cameron, Harwood; Chester D. Myers, Ajax, both of Canada

[73] Assignee: General Foods, Inc., Toronto, Canada

[21] Appl. No.: 244,248

[22] Filed: Mar. 16, 1981

[51] Int. Cl.³ .............................................. A23J 1/14
[52] U.S. Cl. ................................. 260/123.5; 426/656
[58] Field of Search ............ 260/123.5, 112 R, 112 G; 426/656

[56] References Cited

U.S. PATENT DOCUMENTS 3,758,452  9/1973  Owen .............................. 160/123.5
3,817,834  10/1972 Wilson ............................. 195/66 R
4,169,090  9/1979  Murray et al. .................. 260/112 R
4,208,323  6/1980  Murray ............................ 260/112 G
4,285,862  8/1981  Murray ............................ 260/112 R
4,309,344  1/1982  Walsh .............................. 260/112 R Primary Examiner—Allan Lieberman
Assistant Examiner—P. Short
Attorney, Agent, or Firm—Sim & McBurney

[57] ABSTRACT

A substantially undenatured protein isolate is formed from certain legumes and oil seeds, typically rapeseed (canola), by extracting protein from the source material with water and then diluting the resulting protein solution with more water. The dilution forms a dispersion of protein aggregates which are settled from the dispersion.

7 Claims, No Drawings

NOVEL PROTEIN ISOLATION PROCEDURE

FIELD OF INVENTION

The present invention relates to the isolation of proteins from source materials.

BACKGROUND TO THE INVENTION

The isolation of proteins from source materials, such as, legumes and oil seeds, has been the subject of considerable research and a number of procedures have been suggested. One such procedure is the isoelectric precipitation of the protein by extracting the protein with aqueous alkali and then acidifying the extract to the isoelectric point of the protein. A more recent development, described in U.S. Pat. Nos. 4,169,090 and 4,208,323, assigned to the assignee of this application, involves the formation of an isolate under much milder conditions, using an aqueous food grade salt solution of ionic strength in excess of 0.2 M to extract the protein under weakly acid conditions, and dilution of the protein solution to form the isolate.

Protein isolates are characterized by high protein contents, namely at least about 90% by weight (as determined by Kjeldahl nitrogen×6.25), and have utility in various food compositions.

SUMMARY OF INVENTION

It has now been surprisingly found that the protein can be isolated from certain selected oil and legume seeds by a hitherto unknown but very simple and surprising procedure. In accordance with this invention, a vegetable protein seed selected from the group consisting of rapeseed (canola), sesame, pea and cottonseed is contacted with water to dissolve the protein therefrom and water is then added to the protein solution to precipitate an isolate of the protein. The isolate which is attained by this procedure is substantially undenatured. Where the protein source is an oil seed, the seed may be defatted prior to contact with water.

GENERAL DESCRIPTION OF INVENTION AND DESCRIPTION OF PREFERRED EMBODIMENTS

The process of this invention, therefore, is a simple operation requiring extraction of the protein from the plant protein source into water and then dilution of the protein solution with the same solvent, namely water, to precipitate the isolate.

It is quite surprising that proteins of certain plant proteins can be isolated by the simple expedient of diluting an aqueous extract of the proteins, in view of the indications of the prior art, noted above, that alkalinity and/or high ionic strength are required to effect protein extraction.

The plant seed proteins to which the invention is applicable are limited to a defined group, namely, rapeseed (canola), sesame, peas and cottonseed. The plant proteins to which the invention is applied include oil seeds which are valuable sources of vegetable oils for use in a variety of food products and usually are crushed and/or solvent extracted to remove the oil.

The initial step of the process of the invention involves solubilization of the protein in the source material, usually after initial defatting in the case of oil seeds. The particulate plant seed protein, in the form of a concentrate or meal remaining from oil removal operations, is contacted with water. The average particle size of the particulate protein may vary widely, generally between about 10 and about 800 mesh, preferably less than about 50 mesh.

The extraction is effected with water at a concentration of protein source material in the aqueous phase of about 5 to about 25% w/v, preferably about 10 to about 15% w/v. The extraction may be accompanied by agitation to decrease the solubilization time, which is usually about 10 to about 60 minutes. The temperature at which the extraction is effected is not critical and room temperature (about 20° to 45° C.) can conveniently be used. Generally, the temperature of the water used in the extraction step is within the range of about 15° to about 35° C. The water used in the extraction step may be distilled water or tap water, as desired.

When the protein extraction operation has been effected, the protein solution is separated from solid phase extracted material. The protein solution, which may have a protein concentration of about 5 to about 100 g/l, preferably about 20 to about 70 g/l, is diluted in the second step of the process to form a dispersion of protein particles which are collected.

The dilution of the aqueous protein solution may be effected by passing the protein solution into a body of water having a temperature below about 25° C. and preferably about 5° to about 15° C. The dilution is effected to cause the formation of a dispersion of protein aggregates and the isolate may be collected from the dispersion by permitting the protein particles to settle or by inducing settling, such as, by centrifugation.

The settled protein isolate may be removed from residual aqueous phase and dried by any convenient technique, such as, spray drying, freeze drying or vacuum drum drying. The protein isolate has in common with other protein isolates a high protein content in excess of about 90% (as determined by Kjeldahl nitrogen (TKN)×6.25), and often much higher. In addition, the protein isolate is substantially undenatured (as determined by gel filtration), thereby enhancing its functional value.

It has previously been suggested in U.S. Pat. No. 3,758,452 to produce a rapeseed isolate by a procedure involving extraction under alkaline pH conditions and then pH adjustment to acid values. The products of this procedure are said to contain up to about 88% protein (as determined by TKN×6.25). As indicated above, a protein extract is normally regarded as an isolate only when the protein content exceeds 90%. The product formed in this invention conforms with this protein content requirement whereas the protein produced by this prior art procedure does not. The product of the process of U.S. Pat. No. 3,758,452, therefore, is a concentrate and not an isolate and, in addition, is substantially denatured.

The present invention, in one aspect, therefore, relates to a novel product, namely a substantially undenatured rapeseed protein isolate.

EXAMPLES

EXAMPLE 1

Solvent extracted rapeseed meal containing about 50 wt.% protein was formed into a 10% w/v suspension in tap water (pH 5.8) at 20° C. and the suspension was stirred by gentle mechanical action for 30 minutes. The slurry was centrifuged at 10000 xg for 20 minutes and the supernatant protein solution was decanted.

The protein solution was poured into 15 volumes of cold (about 8° C.) tap water resulting in a turbid suspension of pH 6.3. The protein was collected from the suspension in two ways. One half of the volume of the suspension was centrifuged at about 6000 xg for 15 minutes while the other half of the volume of the suspension was allowed to settle overnight in a refrigerator at about 4° C. The settled protein was separated from the aqueous phase and dried. From 2.2 liters of extract containing 33.7 mg/ml of protein, there were collected 27 g (dry weight) of protein.

The protein isolate exhibited a protein content (as determined by Kjeldahl N×6.25) of 106 wt.% and was substantially undenatured (as determined by gel filtration).

EXAMPLE 2

50 g of a pea protein concentrate containing about 55% protein (Kjeldahl N×6.25) were stirred into 500 ml of water (pH 6.41) for one hour at room temperature (about 25° C.). After centrifugation to remove insolubles, 370 ml of extract containing 4.31% of protein (TKN×6.25) were diluted into 2590 mls of cold tap water (8° C.) and a precipitate containing 91.9% protein (on a dry weight basis) was formed.

EXAMPLE 3

30 g of a dehulled, solvent extracted sunflower flour containing 58% protein (TKN×6.25) was stirred into 300 ml of water (pH 6.25) for 45 minutes at room temperature (about 25° C.). After centrifuging to remove insolubles, 240 ml of extract containing 2.61% protein (TKN×6.25) was diluted into 1680 ml of cold tap water (8° C.). No precipitate formed, indicating that the procedure is ineffective in recovering a protein isolate from sunflower. In a similar experiment, it was found that a soybean isolate also could not be formed.

SUMMARY OF DISCLOSURE

In summary of this disclosure, the present invention provides a novel process for isolating proteins from certain plant seeds which enables substantially undenatured protein isolates to be formed by a simple and inexpensive process. Modifications are possible within the scope of this invention.

What we claim is:

1. A method of forming a protein isolate, which comprises:

contacting a plant protein source material selected from the group consisting of rapeseed(canola), sesame, pea and cottonseed solely with water to extract protein from the source material and form a protein solution, and diluting the protein solution with water to precipitate the protein therefrom.

2. The method of claim 1 wherein said plant protein source material is a defatted oil seed protein source material concentrate.

3. The method of claim 1 wherein said contact is effected at a protein source material concentration of about 5 to about 25 wt.% and at a temperature of about 15° to about 35° C.

4. The method of claim 1 wherein said contact is effected at a protein source material concentration of about 10 to about 15 wt.% and at a temperature of about 20° to about 25° C.

5. The method of claim 1, 2, or 3 wherein said contact is effected to form a protein solution of protein concentration of about 5 to about 100 g/l.

6. The method of claim 1, 2 or 4 wherein said contact is effected to form a protein solution of protein concentration of about 20 to about 70 g/l.

7. The method of claim 1, 2, 3 or 4 wherein said dilution forms a dispersion of protein aggregates and said isolate is settled from said dispersion.

* * * * *